Nov. 20, 1962     I. RHODES ETAL     3,065,106
PAN GREASING METHOD AND APPARATUS
Filed Nov. 14, 1958     7 Sheets-Sheet 1
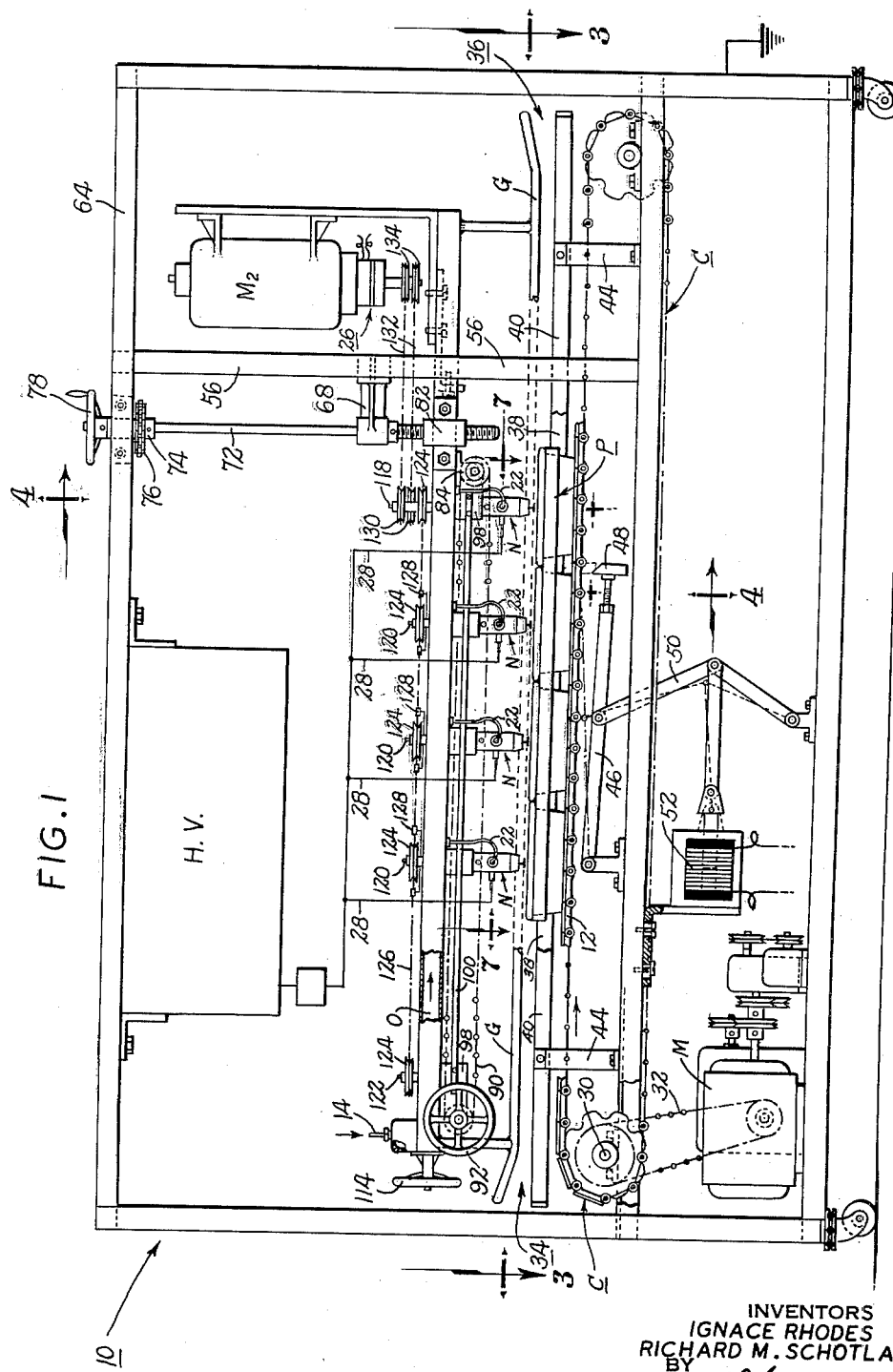
INVENTORS
IGNACE RHODES
RICHARD M. SCHOTLAND
BY
*their* ATTORNEY

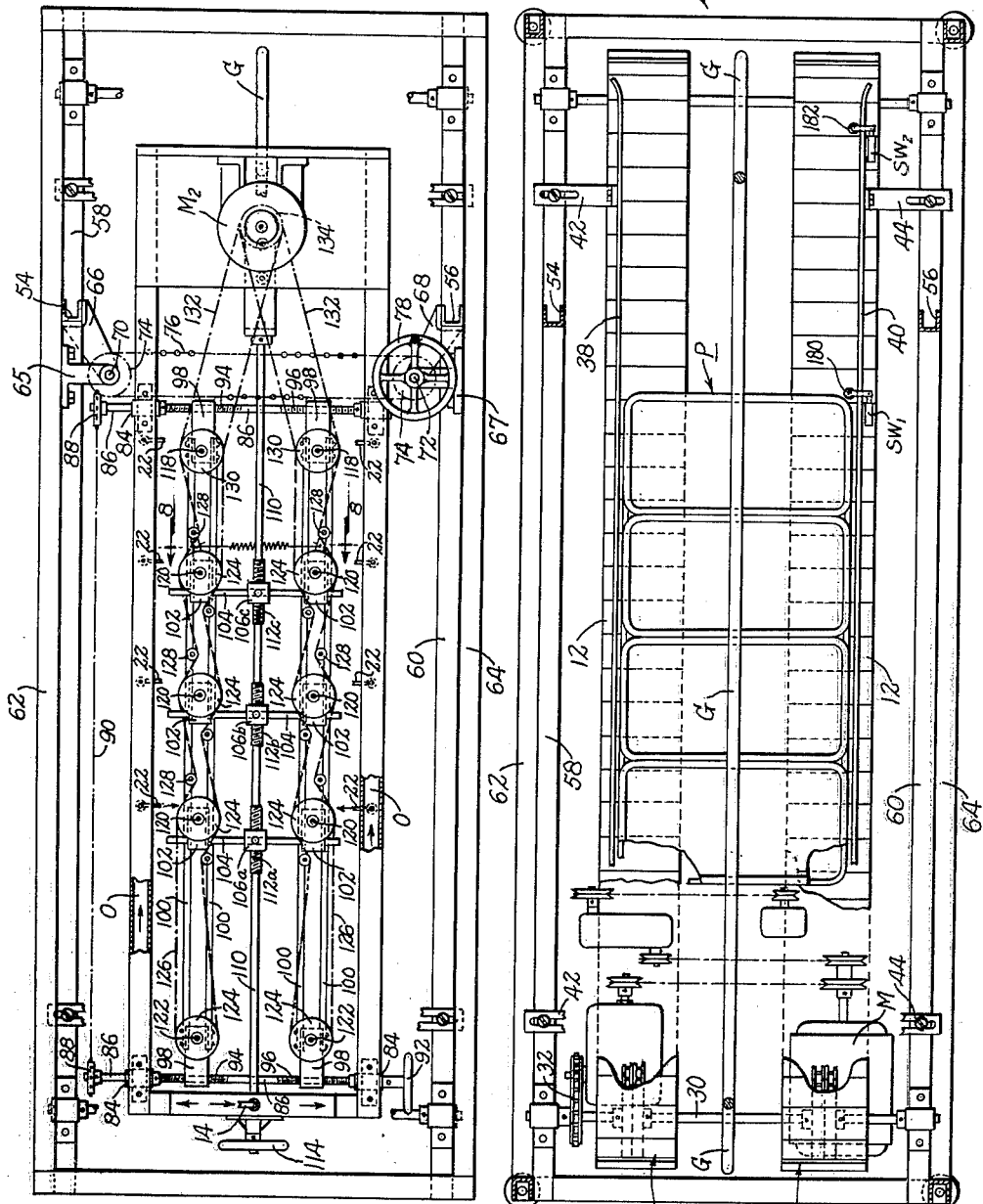

INVENTORS
IGNACE RHODES
RICHARD M. SCHOTLAND
BY
ATTORNEY

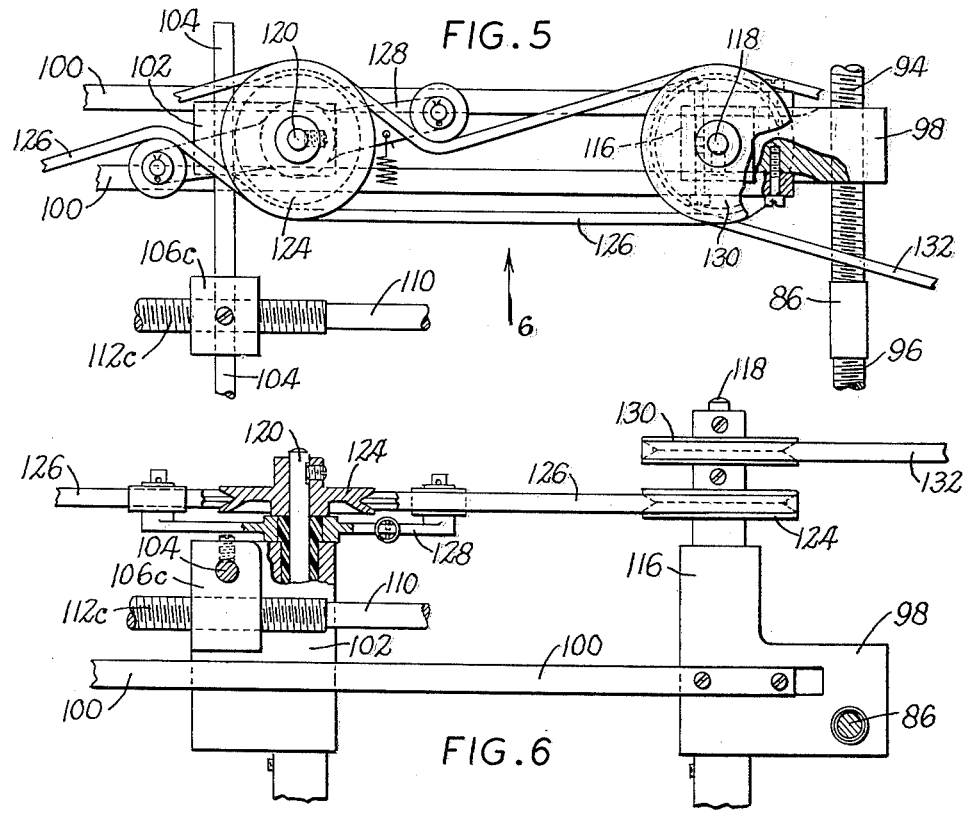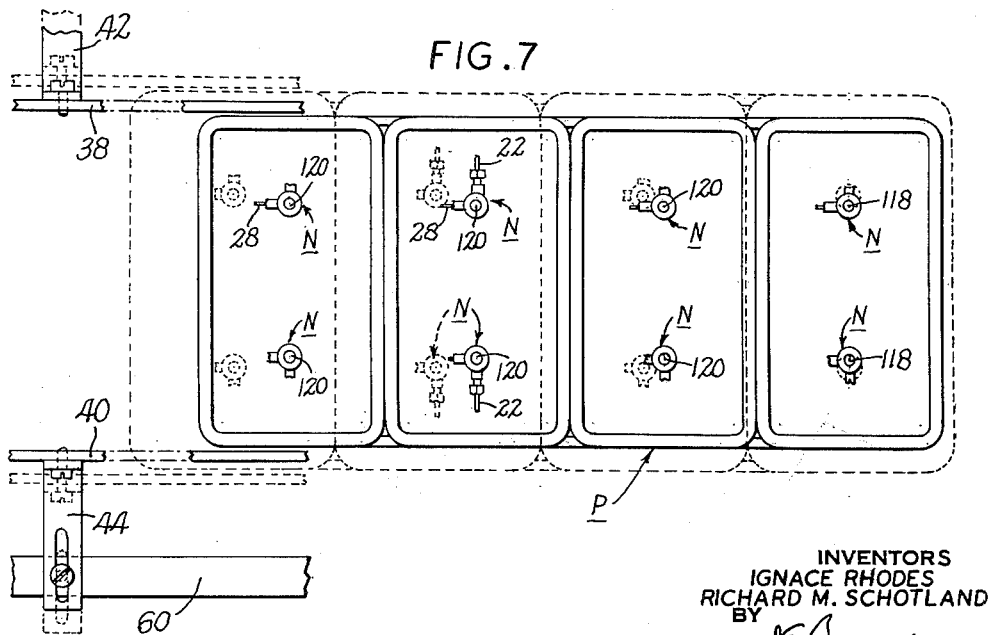

Nov. 20, 1962    I. RHODES ETAL    3,065,106
PAN GREASING METHOD AND APPARATUS
Filed Nov. 14, 1958    7 Sheets-Sheet 5
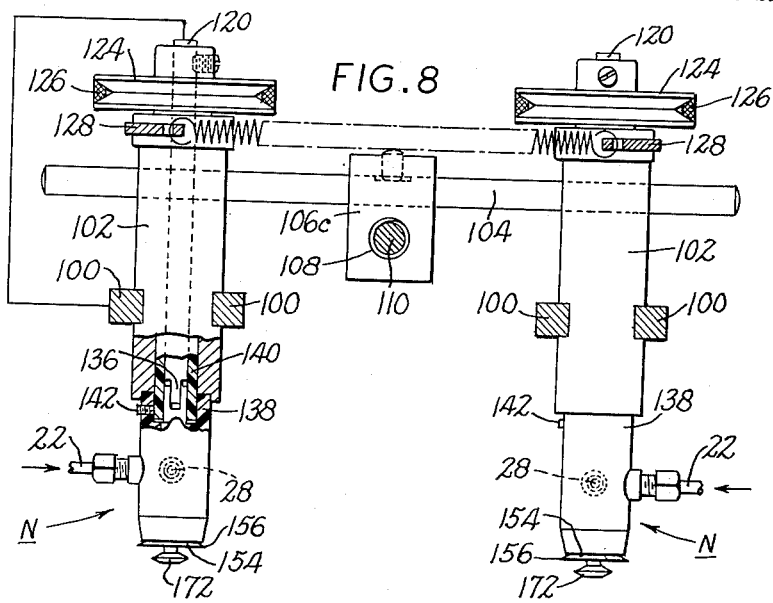
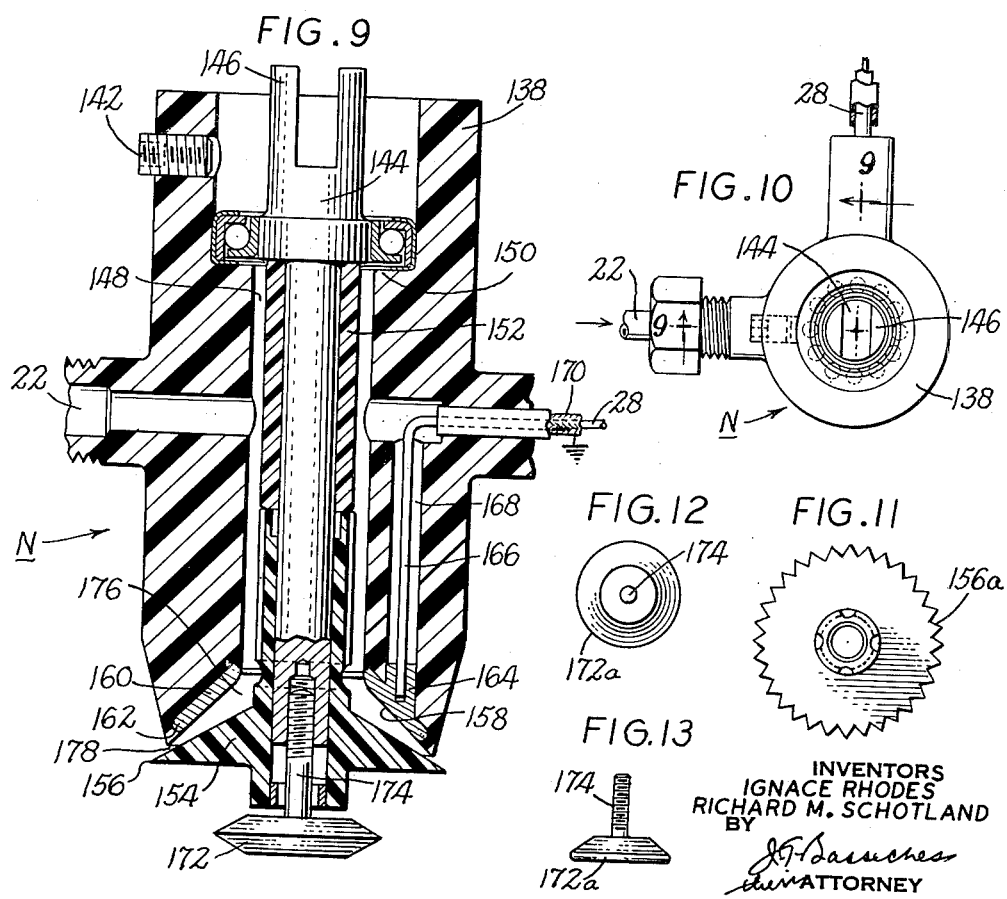
INVENTORS
IGNACE RHODES
RICHARD M. SCHOTLAND
BY
ATTORNEY

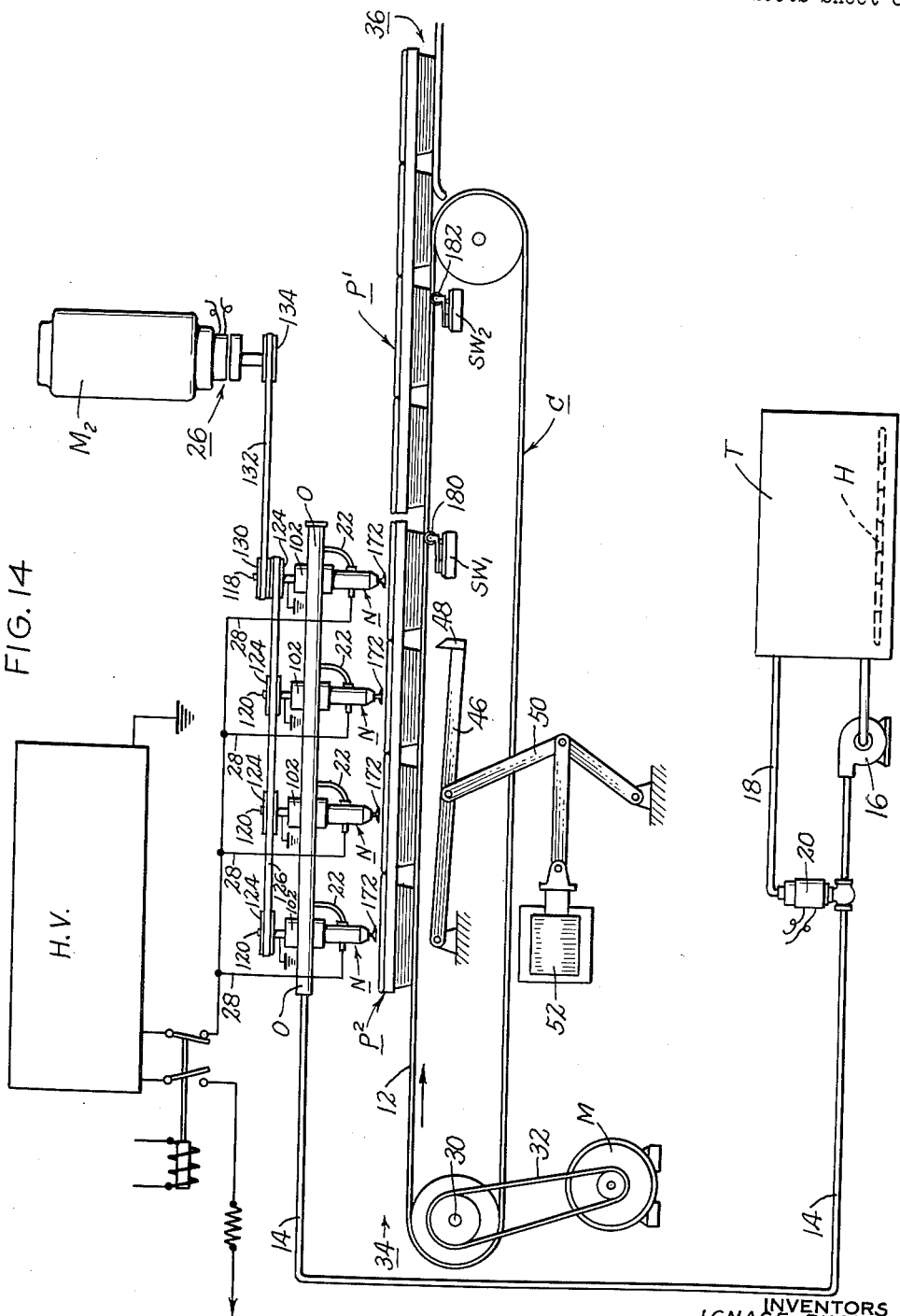

Nov. 20, 1962

I. RHODES ETAL 3,065,106

PAN GREASING METHOD AND APPARATUS

Filed Nov. 14, 1958

INVENTORS
IGNACE RHODES
RICHARD M. SCHOTLAND
BY
*their* ATTORNEY

United States Patent Office 3,065,106
Patented Nov. 20, 1962

3,065,106
PAN GREASING METHOD AND APPARATUS
Ignace Rhodes, New York, N.Y., and Richard M. Schotland, Bloomfield, N.J., assignors to Electro Dispersion Corporation, New York, N.Y., a corporation of New York
Filed Nov. 14, 1958, Ser. No. 773,865
4 Claims. (Cl. 117—93)

This invention relates to pan greasing apparatus, and more specifically to pan greasing apparatus for use in the baking industry, and still more specifically the invention deals with apparatus for applying pan greasing compounds electrostatically dispersed on pans used in the baking industry.

Our invention, in a measure, carries out certain of the features of the invention described and claimed in the sole application of Richard M. Schotland, Serial No. 572,343, filed March 19, 1956, for Process of Coating and Apparatus Therefor, now Patent No. 2,955,565, October 11, 1960, of which this application is a continuation-in-part.

In said application means were devised, among other things, electrostatically to disperse pan greasing compounds upon pans used in the baking industry as part of the preparation of pans to receive bakery products, and particularly upon bread pans, to effect great savings in the use of the greasing material. In said application, hazard-free conditions were contemplated whereby the benefits of electrostatic dispersion may be made applicable to the distribution of pan greasing compounds upon baking pans, said application including a timed movement of an electrostatic spray nozzle with the feed of the bakery pans, to synchronize these components in distributing the pan greasing material, as may be found desirable.

While in accordance with the said sole application aforesaid a non-hazardous condition may be maintained, greater uniformity of treatment is desirable of the receptacles used in baking as variants are encountered in the size and dimensions of the receptacles.

Accordingly, it is an object of the present invention to provide a pan greasing apparatus which will effect great economies in the quantity of pan greasing compound which may be applied, assuring a coordinated relationship between the pan greasing machine and the oven installations whereby continuous flow may be assured.

Still more particularly, it is an object of our invention to provide a pan greasing assembly whereby pan greasing is effected centrifugally, while under dispersion, whereby great economies are effected in the quantity of grease employed and to secure better release of the products baked in the pans, utilizing an electrostatic force to disperse and control the location of the mechanically dispersed stream of pan greasing material, whereby localized areas in which no bakery products contact the pan are left free from grease, thereby to minimize or prevent the formation of carbonaceous products on the pan.

Still more particularly, it is an object of the invention to provide a pan greasing assembly in which a mechanical force such as a centrifugal distributor, may be combined with an electrostatic force for dispersion of the pan greasing material, whereby surrounding conditions are maintained free from fog and fumes, limiting the distribution of grease to the object to be coated and avoiding the formation or accumulation of grease on racks, conveyors and ovens, whereby a high standard of hygienic conditions is maintained adjacent the processing areas in the bakery field.

Still more particularly, it is an object of this invention to provide a pan greasing assembly whereby a spray charge of grease may be electrostatically dispersed, to utilize the electrostatic force to the minimum and accurately to adjust the direction and location of the dispersed material upon the pans to be coated, effecting economies in the use of grease while maintaining a high standard of hygienic atmosphere in the bakery work area.

Still more particularly, it is an object of our invention effectively to automate the sequence of operations of feeding bakery pans in gangs or straps whereby they are accurately provided at localized areas with the most efficient quantity of pan greasing compound, utilizing means to adapt the equipment to a wide variety of sizes and shapes of pans in the straps, whereby further, mechanical means may be used to direct a charge of spray while under the influence of an electrostatic force to disperse and divert the grease accurately under controlled conditions to the pans, eliminating the distribution of grease on areas which may carbonize upon the pan, and maintaining a surrounding atmosphere free from fog and fumes, which normally tend to condense and accumulate on racks, conveyors and oven portions, whereby the pan greasing operation may be carried out in a highly desirable, efficient and economical manner.

To attain these objects and such further objects as may appear herein or be hereinafter pointed out, I make reference to the accompanying drawings, forming a part hereof, in which:

FIGURE 1 is a side elevation in accordance with our invention;

FIGURE 2 is a plan view thereof;

FIGURE 3 is a section taken on the line 3—3 of FIGURE 1;

FIGURE 5 is a fragmentary magnified plan view of a detail;

FIGURE 6 is a side elevation of FIGURE 5, with portions in section on the lines 6—6 of FIGURE 5;

FIGURE 7 is a fragmentary section on the lines 7—7 of FIGURE 1;

FIGURE 8 is a magnified fragmentary sectional view taken on the lines 8—8 of FIGURE 1;

FIGURE 9 is a longitudinal sectional view of the dispersing nozzle, taken on the lines 9—9 of FIGURE 10;

FIGURE 10 is a plan view of the isolated nozzle shown in FIGURE 9;

FIGURE 11 is a bottom plan view of another embodiment of spray disk with a serrated edge;

FIGURES 12 and 13 are plan and side elevations, respectively, of an electrode of another embodiment of our invention;

FIGURE 14 is a diagrammatic outline of the installation;

Figure 4:
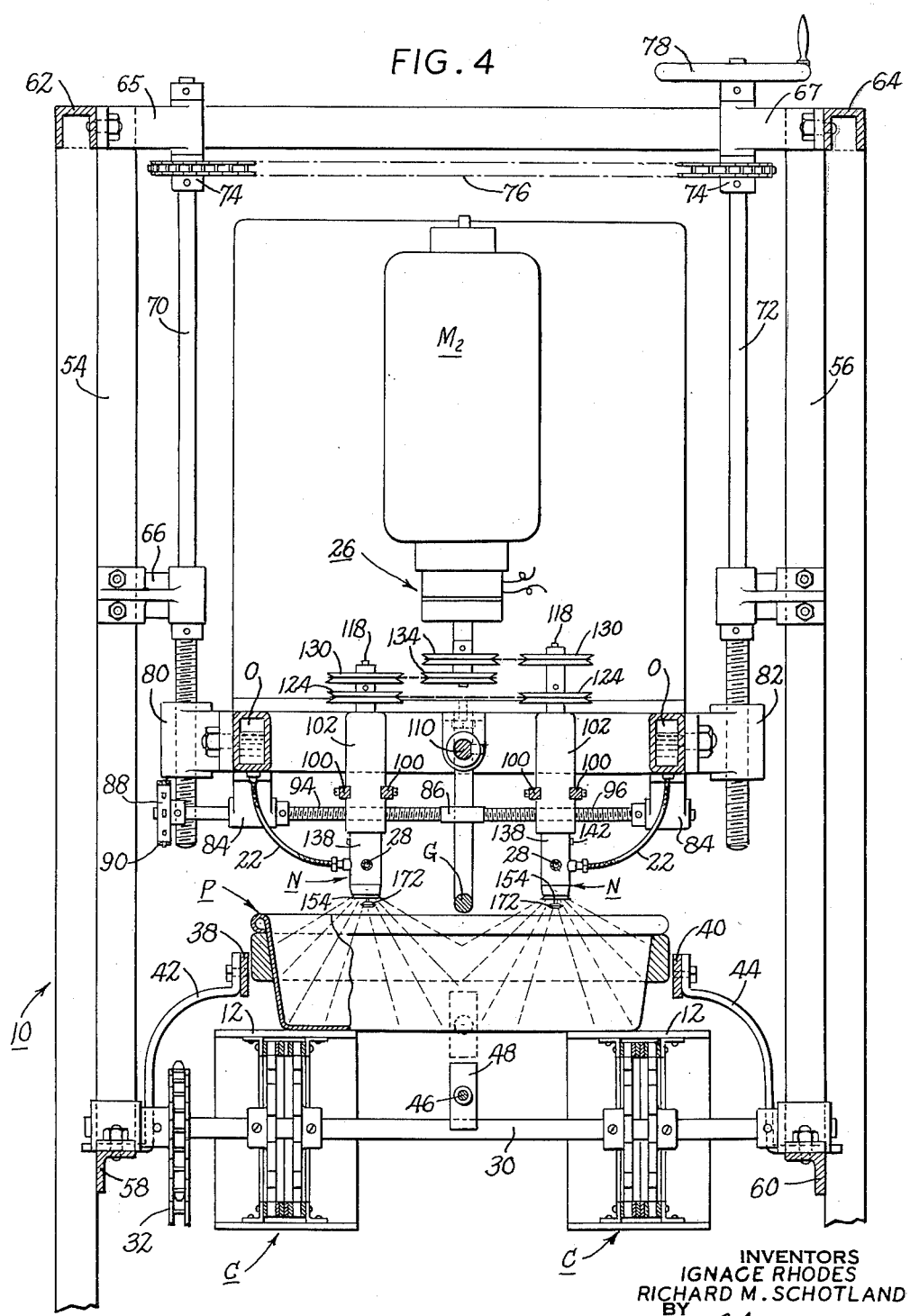
FIGURE 4 is a magnified broken section taken on the lines 4—4 of FIGURE 1.

Our invention has particular application to applying a pan greasing compound consisting of a non-conducting grease which is relatively viscous, simulating heavy honey, at normal temperatures, and it is contemplated to provide a finely divided dispersion of the pan greasing compound to bread pans, in minute quantities in the nature of one quarter ounce to two ounces of such pan greasing compound to a gross of such pans, thereby to effect great savings in the use of the grease because excessive grease is uneconomical, and the minimum amount of grease serves better to release the bread and form a more perfect crust color, as distinguished from mechanical spraying methods of pan greasing in which materially larger quantities are applied to the pans.

It is contemplated that electrostatic means be employed to alter the path of distribution of a spray of grease, thereby not only accurately to localize the pan greasing materials to sections of the pan which are to act as a release for the baked dough but whereby, also, a dispersion characteristic of electrostatic forces is effected to secure a quantum of grease upon the pan surfaces which mechanical means, such as air sprays or brushes, are incapable of achieving.

The apparatus may be summarized as providing a continuously operating conveyor in which pans are fed and, in the intermittent form employing straps, are restrained adjacent a station where a mechanically discharged and electrostatically dispersed stream is diverted accurately upon the pans in time controlled relation to stop means holding the strap in position as it is shifted by the conveyor means. The apparatus further contemplates intermittent feed and coating of pan straps of continuous feed and continuous coating of flat pans, the pans, whether in the form of straps of deeped dished pans or as flat pans, being coated with an economical and efficient amount of grease under hazard-free conditions, despite the use of electrostatic forces to disperse the pan grease, and also localizing the pan grease on the deep or flat pans to eliminate the formation of carbonaceous residues on the edges or outside of the pans, to leave a working atmosphere free from fumes and fog during the application procedure.

In accordance with our invention, by reference to the accompanying drawings, it is intended to provide a unit 10 which may be bodily incorporated in the production line of a bakery where pans or straps of such pans are preliminarily treated before charging the same with the dough or batch. For this purpose, there is assembled in the unit 10 a carrier C with relation to which one or more nozzles N, preferably two for each pan, are assembled intermittently or continuously to discharge a controlled amount of pan greasing compound to pans P fed by the carrier C. Provision is made for influencing the charge of pan greasing compound discharged by the nozzles N and for this purpose we have employed the distribution force of a rapidly rotating disk centrifugally to spray a charge of pan greasing compound, while simultaneously, under the influence of an electrostatic force which electrostatically disperses the pan greasing compound, to divert the pan greasing compound to predetermined localized areas of the baking pans to be coated, the bakery pans being located in a field-free space so that hazardous conditions normally accompanying the operation by high voltages are not present.

In the diagrammatic outline of the installation in FIGURE 14, the carrier C, in the form of a continuous chain or belt, is driven by the motor M and arranged to have its upper flight 12 moved from left to right in the view as provided, to carry thereon by frictional contact a series of straps of pans P1 and P2, which may move beneath a bank of nozzles N. Each of the nozzles is supported by a manifold O. The manifold O is connected by the conduit 14 to a tank T provided with suitable heating means H to reduce the viscosity of the pan greasing material or oil. A pump 16 recirculates the pan greasing material in the tank through the line 18 and the three way valve 20, to feed the manifold O through the conduit 14 when the valve 20 is periodically activated. Each of the nozzles is fed from the manifold O through the oil lines 22. The nozzles have spinner shafts 24 arranged to spin a distributing disk which will be more specifically described, and centrifugally spray the pan greasing compound or oil when it is fed to the disk in a substantially horizontal plane.

A common motor M2 for the gang of nozzles has a solenoid actuatable clutch 26 for timed activation of the spinner shafts 24, in accordance with a timing impulse on the solenoid for the clutch 26. Each of the nozzles N is arranged to be charged by the lines 28 connected to the high voltage source HV for a time controlled and optionally variable impulse of an electrostatic charge which has the influence of electrostatically dispersing the pan greasing particles to divert the spray and localize it on a predetermined area to be contacted by the dough. Alternatively, by variably adjusting the potential imposed on the electrostatic electrode during centrifugal spinning of the nozzles, the area of the pan may be scanned or swept by the dispersed grease or oil so as to avoid a fixed pattern outline and overlap the coating to cover the pan surface uniformly. Localization to avoid application of the pan grease to portions of the pan not in contact with the dough or like bakery product may be effected while electrostatically dispersing the pan grease or oil, thereby avoiding in the final baking operation in the oven a charring of the grease not in contact with the bakery product, and likewise avoiding an atmosphere of dispersed particles in and around the pans.

In a measure, the procedure may include mechanically distributing and electrostatically dispersing the pan grease by the use of a nozzle, such as set forth in the aforementioned application of Schotland, particularly employing a frusto-conical distributor rotated in relation to a metering gap while under the influence of an electrostatic impulse in such close proximity to a grounding electrode that the dispersed particles are thrown in a field-free space, whereby hazardous conditions are eliminated.

With a distributing disk of about 1¼" in diameter, rotation at speeds of from 1200 r.p.m. to 1700 r.p.m. effects a distributing force tending to effect a spray in a substantially horizontal direction. The imposition under these operating conditions of an electrostatic potential of from 20 to 30 kv. of a depanning compound of a viscosity of .5 poise, and an emitting aperture adjacent the nozzle of a depth of .004" or varying from .002 to .005" effectively diverts the pan grease discharge to direct the pan grease in ring-shaped outline to desired localized areas on the bakery pan. Heating the grease to reduce its viscosity makes possible a lower speed while greater speeds may be used with a more viscous condition of the oil. Also, varying the potential of the electrostatic force within a range from 20 to 30 kv., within a given period of time, such for example as five times per second, the pattern of the conically shaped stream is changed to scan the bakery pan with the dispersion and uniformily distribute the same, the quantity of dispersion being so minute as to effect economies in the use of the pan greasing compound, as well as to secure an efficient release of the bakery product from the pan and a desirable surface texture on the bakery product.

In carrying out the procedure above described, reference is now made specifically to one embodiment of our invention wherein the frame 10 horizontally supports the endless carrier C on the shaft 30, being driven by the belt 32 from the motor M. Two such carriers are employed in accordance with the width of the pan and, as more particularly shown in the illustration, a strap of such pans, each strap containing four bread pans in a gang, may be employed.

The carriers C are spaced laterally from each other to support the pans at two points. The carriers C are relatively smooth and engage the straps frictionally, by their own weight, to carry the pans from the filling end 34 to the discharge end 36.

Transversely, the straps of pans are guided by rails 38 and 40, the rails 38 and 40 being adjustably held by brackets 42 and 44 extending from the frame, adjustment being made in accordance with the width of the pans to be coated.

The pans P may thereby be fed continuously from the entrance end 34 to the exit end 36 where flat, continuous pans are to be coated. In the illustration, however, the straps are individual units for receiving a charge of bread dough or like bakery product and it is intended intermittently to restrain the movement of the straps in relation to the impulse of the carrier C while the pans receive the coating of pan greasing compound.

For this purpose, stop mechanism 46, comprising a pivoted bar having a tooth 48 at one end, is pivotally supported preferably in the space between each of the carriers alternatively to direct the tooth 48 in the gap between two pans of the strap. The carrier, although continuously moving in the direction as described, thereby moves in relation to the fixed position of the strap. For this purpose, there is illustrated a toggle 50 under motivation of a solenoid 52, as will be hereinafter described, periodically to actuate the stop mechanism 46.

Overhanging the carrier is the assembly of nozzles N previously described, which includes the vertical standards 54, 56, extending from the supporting beams 58 and 60 and the upper beams 62, 64, from which journals 66 and 68 are extended for the adjusting shafts 70, 72. Sprockets 74 on each of the shafts 70, 72 are joined by the chain belt 76 for rotation of the shafts 70 and 72 in unison when the shaft 72 is rotated by the hand wheel 78.

Each of the shafts 70 and 72 is threaded at its lower end and extends into the collars 80, 82, respectively. The collars 80, 82 extend from the manifolds O previously described, and thereby it will be observed that rotating the shafts 70, 72 will serve threaded to adjust the position of the manifolds O with relation to the carrier C.

The manifolds O likewise support downwardly extending journals 84 through which transverse shafts 86 are directed. The shafts 86 are coupled by the sprockets 88 and belt 90 to turn in unison under the influence of the lateral control hand wheel 92. Each of the shafts 86 is threaded at 94, 96 by threads pitched reversely with relation to each other, one having a left hand and the other a right hand thread.

Threadedly coupled to the shafts 86 are the spaced frames 98, 98. It will be observed that rotation of the shafts 86 by the hand wheel 92 will adjustably position the frames 98 to each other and therefore in relation to the transverse dimension of the pans in the strap P.

The frames 98 constitute spaced guides 100, along which shoes 102 may be slidably adjusted. The shoes 102 are arranged in pairs of two, running abreast along the guides 100, and are joined by the cross shafts 104. Collars 106a, 106b and 106c are threaded at borings 108 to receive the longitudinally extending shaft 110.

The shaft 110, where it engages the collars 106a, 106b and 106c, is threaded at sections 112a, 112b and 112c. The pitch of the threads 112a, 112b, 112c may differ from each other so that rotation of the shaft 110 by the hand wheel 114 will position the shoes 102 associated with the shafts 104 at varying distances for each revolution of the hand wheel 114.

Each of the frames 98, adjacent the right hand end thereof, is provided with a vertical journal 116, fixedly positioned to receive the shaft 118. Each of the shoes 102 is likewise formed with journalled portions to receive shafts 120. The left hand end of the frames 98 is formed with journals supporting shafts 122. Each of the shafts 118, 120 and 122 is provided with pulleys 124, coupled to the belts 126, whereby rotation of all of the shafts may be effected in unison. Belt tensioning means 128 takes up the slack of the belts 126 in the various slidable positions which the shoes 102 may assume along the frames 98 and the guides 110 by the adjustment effected by the hand wheel 114.

The shafts 118 carry auxiliary pulleys 120, coupled by the belts 132 to the pulleys 134, extending from the motor M2. Solenoid actuated clutch means 26 selectively actuate the pulleys 134 to drive the gang of pulleys 124, as will presently appear. Each of the shafts 118 and 120 terminates in coupling fingers 136 to receive the nozzle assembly N, more clearly illustrated in FIGURE 9.

The nozzle assembly constitutes a sleeve or tube of efficient insulating material, such as nylon, having a collar 138 which may fit over the bushings 140 in which the shafts 118 and 120 are rotatably mounted. A set screw 142 may serve to hold the nozzle N in coupling engagement with the bushings 140. Each of the nozzles N rotatably supports a spinner shaft 144, one end 146 of which has a slotted keying portion arranged to receive the finger 136 for coupling of the spinner shaft 144 to the shafts 118 and 120, as the case may be. The nozzle has a central boring 148 outlining a shoulder 150, serving as a support for the frictionless bearing axially to support the spinner shaft 144.

The spinner shaft 144 has an insulating sleeve 152 extending along its length into a distributor 154. The distributor constitutes a generally frusto-conical disk, the periphery of which terminates either in a fine point 156 or in serrations 156a, shown in FIGURE 11.

The distributor 154 is spaced in complemental position to the frusto-conical annulus 158 at the lower terminal portion of the nozzle N. Into the annulus is positioned the charging electrode 160, preferably of ring-shaped outline, having rounded corners 162. The electrode 160 is formed with a coupling lug 164 arranged to receive the lead 166 extending through the boring 168 in the wall of the nozzle N and, in turn, coupled to the line 28, suitably insulated and preferably provided with a grounding shield 170.

The spinner shaft 144 also axially supports the grounding electrode 172 extended from the shaft 174, screw-threaded into the spinner shaft 144. The grounding electrode 172 may be a sharp edged disk, shown in FIGURE 9, but preferably may have the contour of a frusto-conical element 172a shown in FIGURE 13, the peripheral edges of which are preferably rounded to avoid sharp edges.

Extending downwardly from the manifold supporting frame O is a guard rail G which extends centrally for the full length of the assembly from the left hand entrance end to the right hand exit end of the installation. Being carried by the frame O, it is adjustable upwardly and downwardly over the carrier C at a height just above the straps P, thereby limiting not only the lower movement of the bank of nozzles N to just beyond the grounding electrode 172 but further assuring that the straps or flat pans will not tilt away from the carrier to contact the grounding electrode 172 as they are drawn through the coating cycle by the carrier.

The distributor 154 outlines an annulus 176 terminating with respect to the distributor 156 in a sharp edge annular aperture 178, communicating at the other end with the passage 148, joined to the feed line 22 previously described. The feed line 22 is connected with the manifold fed by the line 14 in communication with the solenoid controlled three way valve 20.

Figure 15:
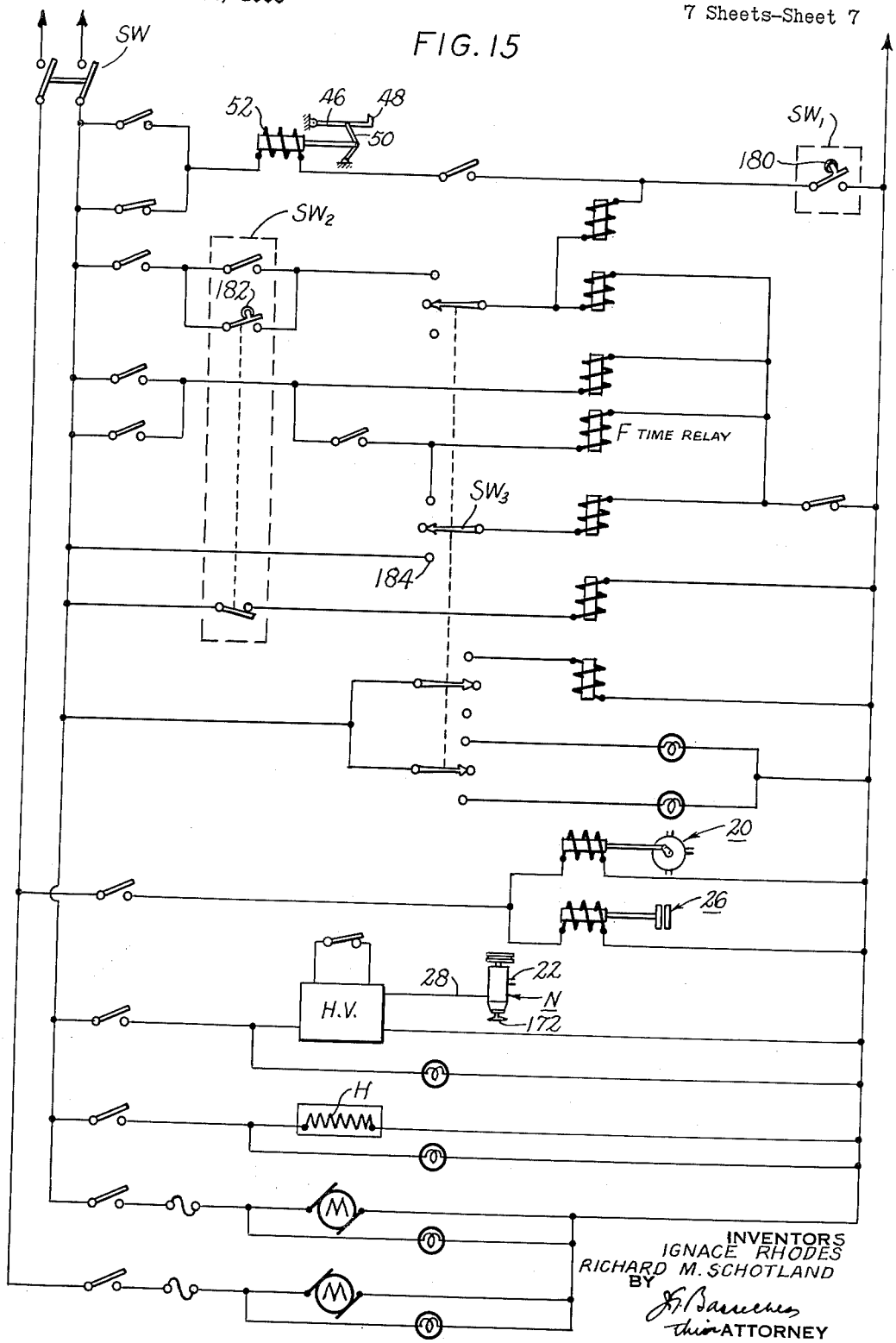
FIGURE 15 is a schematic outline of the wiring diagram of the installation.

Reference may now be made to the wiring diagram, FIGURE 15, to coordinate the mechanical as well as electrical relationship of the assembly.

It is intended that closing of the main switch SW will energize the motor M, the motor M2 and the pump 16. The pump 16 circulates the oil in a tank T continuously through a solenoid actuated three way valve 20 in a closed circuit. Where the nature of the pan greasing compound is such that high viscosity pan greasing materials are utilized, the pan greasing material may be liquefied and maintained in this condition by the heater H.

With the manifolds O suitably filled, no grease will flow from the apertures 178 of the nozzles N.

Carried by the guide 38 are a pair of switches SW1 and SW2, each of which has an extension finger 180, 182, in the path of the strap so that as the strap comes in contact with the fingers, it will close the circuit controlled by the switches CW1 and SW2. At the outset, the switch SW2 is normally open. Before a single strap is inserted at the entrance 34, the SW2 switch is manually closed. This activates the solenoid 52 so that as the strap is moved along the upper flight of the carrier C to reach a position where the pans become aligned with the nozzles, the tooth 48 will enter the space between the third and fourth bread pans of the strap and restrain further movement of the strap by the carrier until the solenoid 52 is deactivated. This condition persists as long as the switch SW2 has its finger 182 contacted by the strap, to maintain the relay for the solenoid 52 activated.

The spacing of the switch SW2 from the switch SW1 is such that the leading strap of pans P1 must have been removed from the path of the trailing strap of pans P2 before the solenoid 52 is deactivated by the normally closed segment of the switch SW2.

At all times, on closing the main circuit switch SW, the motor M2 is rotated but driving belt 132 is not activated or powerized until the solenoid clutch 26 has been activated. This occurs under the influence of the time relay F which is set to be activated or deactivated in the period of time of one sixth second to three seconds or more, depending upon the time of exposure to the spray which is desired. That is, the quantity of spray which is deposited is determined by the duration of exposure to the spray. Its distribution is dependent, for scanning being effected where desired, by a change in the strength of the impulse of high voltage within the range indicated.

The time relay F likewise controls the relay for the high voltage HV which normally includes a resistor circuit to by-pass the charge from the high voltage unit except when the relay is closed to effect an electrostatic discharge through the nozzles. At the beginning of the time cycle for closing the relay F, there occurs simultaneously the actuation of the solenoid 26 to set the spinner shafts in operation. The by-passing of oil through the solenoid operated valve 20 to induce the desired pressure head on the oil in the manifolds O and thereby effect flow of oil through the conduits 22 to the nozzles N is accompanied by an impulse of high voltage within the limits described through all of the conduits 28 to the nozzles N. Therefore, there occurs with the closing of the time relay F (1) centrifugal spinning to distribute the pan greasing material in a substantially horizontal plane in a rather heavy globular condition; (2) the increased pressure head to feed the oil; (3) the electrostatic impulse to disperse the particles and divert the dispersed particles of pan greasing material on localized areas or, where there is a means for varying the impulse during the period of time for the electrostatic impulse to scan the spray over areas of the pans.

At the completion of the period of time for which the time relay has been set, all three relay circuits which control the valve 20, the clutch 26, and the electrostatic charge for the line 28, are thereby broken.

The moving away of a pan P1 opens the switch SW2 and deenergizes the solenoid 52, to draw the stop tooth 48 from restraining the strap. Should another pan P1 be in position activating the switch finger 182 to the closed position, solenoid 52 restrains the stop tooth 48 in the strap blocking position so that it continues to slip along the surface of the rotating carrier until the leading strap has been removed, to release the tripped condition of the finger 182 of the switch SW2.

The setting of the time relay F for intermediate spraying is an empirical determination which experience will dictate, depending upon the quantity of pan greasing material desired to be deposited, as previously described.

Should it be desired continuously to coat pans, such as flat pans used for cookies or unformed bakery products, switch SW3 is moved to close the circuit with the contact 184. This serves continuously to clutch the spinner motor, to activate the solenoid actuatable valve 20 for the continuous feed of oil and to continuously impose an electrostatic impulse on the nozzles N.

A high degree of accurate control of the amount of grease deposited is thereby secured, and the direction confined to predetermined localized areas inside of deep pans, where these are used, and upon the surface of flat pans, where the latter are to be treated.

The time control means employed may be used to adjust the apparatus to the speed of the molder which is to fill the pans with the dough.

Great economies are effected because of the avoidance of the application of excess grease, resulting in highly desirable baking characteristics and crust color. The accurate control of the high velocity, electrostatically sprayed particles maintains an atmosphere in the premises which is free from fog, and fumes, eliminating the formation of carbonaceous deposits on the edges or outer portions of pans.

Electrostatic dispersion as carried out by reason of the projection of the sprayed particles in a field-free space makes for a compact arrangement and permits manual adjustments to be made without fear of encountering hazardous electrostatic conditions.

Having thus described our invention and illustrated its use, what we claim as new and desire to secure by Letters Patent is:

1. The method of depositing pan grease on a bakery pan by spraying the grease centrifugally from a nozzle to distribute a stream of said grease in a direction normally radially diverging from said nozzle and simultaneously electrostatically dispersing and controlling the stream to converge from the centrifugally directed radial divergence to within predetermined outlines within the pan, the pan being coated in a substantially field-free space by forming an electrostatic field between said nozzle and a grounding electrode carried by said nozzle insulated to one side of and adjacent said nozzle.

2. A pan greasing assembly for supplying coated pans in a bakery system comprising, in combination, an endless carrier for pans arranged to support the pans to pass in close proximity to a bank of nozzle means arranged to distribute a film supply of grease from said nozzles toward said pans by centrifugal distribution, each nozzle having electrostatic means including a charging electrode, a grounding electrode insulated from and adjacent to said charging electrode, said charging electrode being connected to a high voltage source to create an electrostatic field between said nozzle means and said grounding electrode, said grounding electrode being carried by said charging electrode to disperse said grease to distributed from its centrifugal path and divert the same from the path of centrifugal distribution onto localized areas of said pans to the exclusion of other portions which are left uncoated.

3. A pan greasing assembly for supplying coated pans in a bakery system comprising, in combination, a bank of nozzle means, means for distributing said grease in said nozzles in film form comprising a centrifugally rotatable distributor to provide a widely divergent spray, means for guiding said pans and nozzle means relatively to each other in close proximity to each other, and each nozzle having a charging electrode and a grounding electrode insulated from and closely adjacent said charging electrode and adjacent said film, and said charging electrode being connected to a high voltage source providing means to impose an electrostatic dispersing impulse on said distributed grease to create an electrostatic field between said grease in film form and said grounding electrode while under the first distributing influence, for localizing said grease on said pans from the normal path of said distributor alone.

4. A pan greasing assembly for supplying coated pans in a bakery system comprising, in combination, nozzle means for distributing said grease comprising a centrifugally rotatable distributor disk whose axis is normal to said pans and positioned to disperse grease radially, a high voltage source providing means to impose an electrostatic dispersing impulse on said disk on which said grease is distributed comprising a ring-shaped electrode, means for localizing and diverting said grease on said pans, including a grounding electrode disk insulated from said distributor and carried by said distributor to create an electrostatic field between said first disk and grounding electrode whereby said grease is electrostatically dispersed from said radial direction onto said pans in a substantially field-free space.

References Cited in the file of this patent

UNITED STATES PATENTS

| | | |
|---|---|---|
| 2,509,448 | Ransburg et al. | May 30, 1950 |
| 2,557,479 | Smith | June 19, 1951 |
| 2,567,781 | Ransburg | Sept. 11, 1951 |
| 2,595,342 | Dosmann | May 6, 1952 |
| 2,633,820 | Koerber | Apr. 7, 1953 |
| 2,770,210 | Miller | Nov. 13, 1956 |
| 2,955,565 | Schotland | Oct. 11, 1960 |

FOREIGN PATENTS

| | | |
|---|---|---|
| 679,751 | Great Britain | Sept. 23, 1952 |
| 710,852 | Great Britain | June 23, 1954 |